Jan. 3, 1956 W. KNAPP 2,729,758
ELECTRIC MOTOR
Filed Sept. 10, 1952 2 Sheets-Sheet 1

INVENTOR
Walter Knapp
BY
ATTORNEYS.

Jan. 3, 1956  W. KNAPP  2,729,758
ELECTRIC MOTOR
Filed Sept. 10, 1952  2 Sheets-Sheet 2
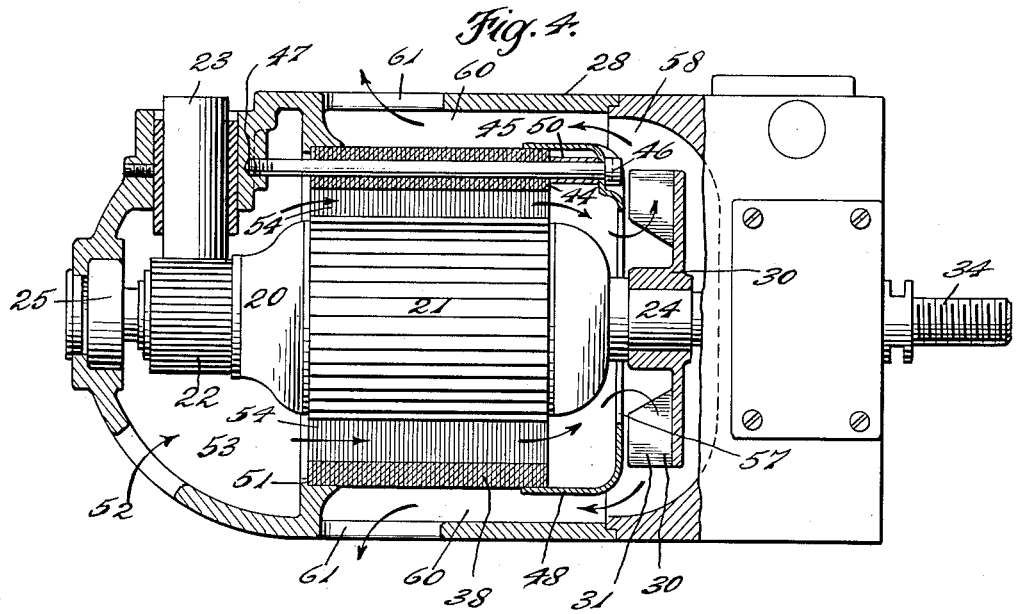
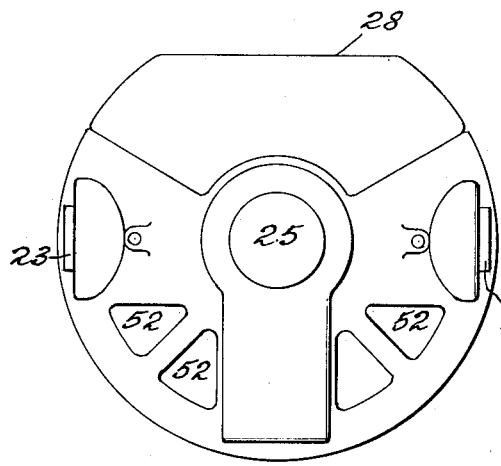
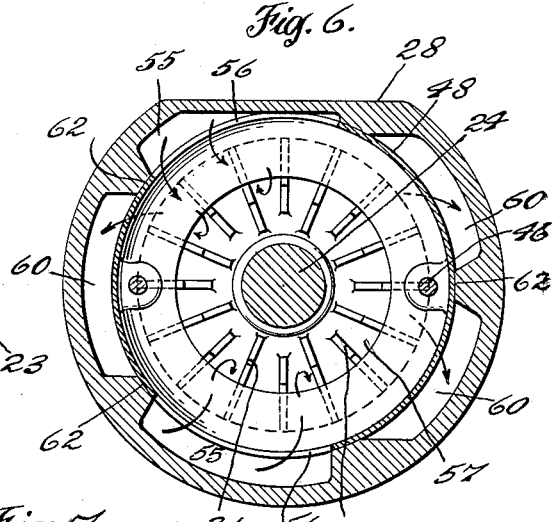
INVENTOR
Walter Knapp
BY
ATTORNEYS.

United States Patent Office 2,729,758
Patented Jan. 3, 1956

2,729,758

ELECTRIC MOTOR

Walter Knapp, Manheim Township, Lancaster County, Pa., assignor to Reamstown Products Company, Reamstown, Lancaster County, Pa., a corporation of Pennsylvania Application September 10, 1952, Serial No. 308,736

6 Claims. (Cl. 310—59)

The present invention relates to electric motors and particularly relates to arrangements for cooling the same.

A purpose of the invention is to circulate air longitudinally of an electric motor adjoining the relatively rotating parts from an inlet at one end of the housing to a fan and then to reverse circulate the air longitudinally through another passage inside the housing before discharging the air.

A further purpose is to bring the air longitudinally of the motor from the inlet in a passage between the magnetic core and the rotor along the longitudinal portions of the stator coils or in a passage between the circumferential portions of the stator coils and the housing, or preferably in both passages, and then to bring the same air in reverse flow through a passage between the magnetic core and the housing.

A further purpose is to bring the air into the fan close to the shaft to avoid swirling.

A further purpose is to omit discharge ports commonly used radially of the fan to prevent insertion of tools and equipment which may damage the fan or destroy the motor and also to eliminate the siren-like noise commonly obtained.

A further purpose is to place the outlet cooling ports opposite the motor proper rather than the fan so as to obtain greater length of the discharge port and slower air flow at discharge.

A further purpose is to draw air across the stator winding at both ends of the motor.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 4 is a top plan view partly in irregular plan section on the line 4—4 of Figure 2.

Figure 5 is a rear end elevation.

Figure 6 is a section on the line 6—6 of Figure 1.

Figure 7 is an isolated side elevation of the cowling.

Figure 1:
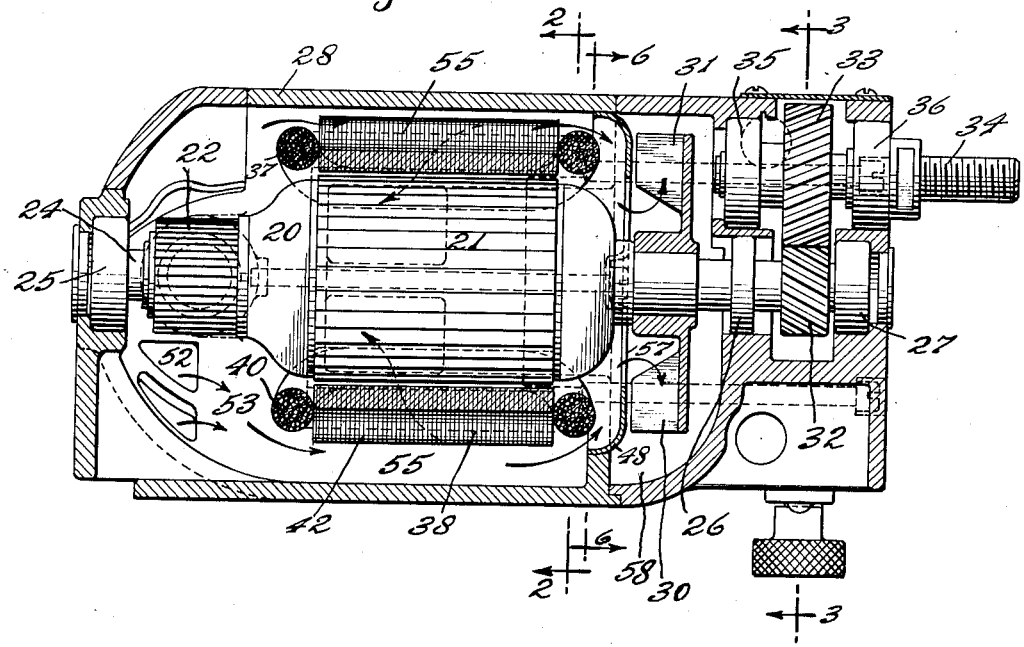
Figure 1 is an axial section through the motor of the invention.

Describing in illustration but not in limitation and referring to the drawings:

In small motors of the type suitable, for example, for woodworking tools, which are subjected to wide variations in load and operate at considerable speeds, cooling has been a serious problem. It has been difficult to obtain adequate circulation passage cross section without greatly increasing the motor size, and there has been trouble in securing proper heat transfer between the elements which develop heat and the cooling air.

Ineffective use has also been made in some cases of the circulating fan usually employed. The motors produced have been noisy, not only due to the siren effect from air discharge radially of the fan, but also due to the high velocities of air discharge.

In accordance with the present invention, very effective heat transfer is obtained by bringing the air directly across the stator coils at both ends and also bringing the air directly along the rotor, and then flowing the air in reverse inside the housing and longitudinally of the magnetic core.

To avoid swirling at the fan, the air at the point of reversal is brought in close to the hub or shaft of the fan before being introduced to the fan.

I avoid outlet ports radially of the fan and instead provide outlet ports radially of the motor proper and preferably at the end remote from the fan. This avoids the danger of inserting small tools and the like into the fan, which may damage the equipment and it also reduces the noise since the siren effect due to the radial ports is avoided.

Since the axial length available for the discharge ports is quite adequate opposite the motor proper, wider discharge ports are possible than opposite the fan, so that the velocity of the exit air is reduced, further reducing noise.

The passages longitudinally through the motor are quite wide and give effective cooling.

As shown in the drawings, a rotor 20, suitably an armature, has a winding of any suitable electrical character for alternating or direct current, here shown at 21, connected to a commutator 22 engaged by brushes 23. It will be evident that since the present invention is concerned with cooling, the detail regarding the electrical character of the motor, whether direct current, alternating current or universal, is not critical, and any conventional motor may be employed. The armature and commutator are mounted as well known on a shaft 24 which is journalled at one end in bearing 25 and at the other end in bearing 27, supported in a housing 28.

A fan 30 is secured on the motor shaft and has radially extending blades 31 which are best seen in Figures 1, 4 and 6.

Figure 2:
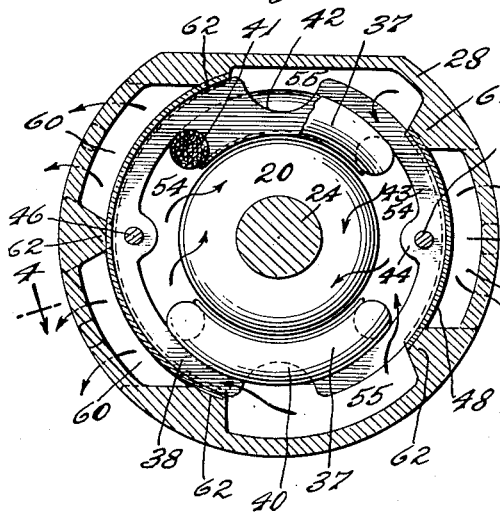
Figure 2 is a transverse section on the line 2—2 of Figure 1.

Isolated from the rest of the armature by oil seal 26, the shaft mounts a pinion 32 which is suitably intergeared in the motor shown with gear 33 on arbor 34 journalled in bearings 35 and 36 in the housing. The gears may suitably be helical gears as shown or of any other desired type. Stator coils 37 suitably field coils, surround the rotor, and in the form shown are curved coils of generally rectangular outline placed at diametrically opposite position as best seen in Figures 1 and 2. A magnetic core 38 consisting of a stack of laminations as best seen in Figures 1, 2 and 4 surrounds the rotor and surrounds the stator coils 37 except at 40 where they extend across the ends of the core. The core is of generally circular but irregular outline as shown in Figure 2 and has notches 41 (Figure 2) which receive and hold the stator coils.

As seen in Figure 2, the core has diametrically opposite external notches 42 which increase the air passage cross section as later explained, and has circumferential segments 43 between the relatively inwardly extending notched portions which carry ears 44 having openings 45 which receive bolts 46 threaded into the housing at 47 to hold the core laminations in position. A cowling 48 is placed endwise between the armature and the fan, and held in place by the same bolts 46, washers 50 surrounding the bolts applying pressure at one end of the magnetic core laminations, and sockets 51 formed in the housing at the other end receiving the opposite end of the core laminations.

The housing at the end opposite from the fan has a suitable series of inlet ports 52 at the end of the housing remote from the fan which admit air into a space 53 surrounding the commutator. There are then two sets of passages extending longitudinally to carry air from left to right in Figures 1 and 4. One set of passages 54, as best seen in Figures 2 and 4, extends toward the fan between the rotor at the inside and the magnetic core at the outside and along the longitudinal stretches of the stator coils, thus cooling the rotor, the magnetic core and the stator coils. The passages 54 are limited circumferentially by the stator coils as seen in Figure 2.

Another set of passages 55 extends longitudinally between the circumferential portions of the stator coils and the magnetic core on the one hand and the housing on the other hand, as best seen in Figures 1 and 2. Thus all four legs of the stator coils are cooled and air passes both inside and outside of the magnetic core.

When air in the passages 54 and 55 approaches the fan, it encounters the cowling 48 which receives air from passages 55 through radial recesses 56 in the cowling and in any case discharges the air in a passage 57 close to the radial inner portion of the fan adjacent the shaft and the hub, thus preventing swirling.

The fan chamber 58 is entirely closed at the radial outer portion, but at intervals around its circumference connects with reverse passages 60 (Figures 2, 4 and 6) which extend longitudinally between the magnetic core on the inside and the housing on the outside to a position adjacent the opposite end of the magnetic core and rotor from the fan, at which point they discharge radially into elongated discharge ports 61, thus assuring comparatively slow air flow at discharge without siren effect and without marked whistling.

Portions of the cowling 48 define parts of the passages 60, and the passages 60 are separated from the passages 55 by longitudinally extending radial ribs 62 from the inside of the housing.

Figure 3:
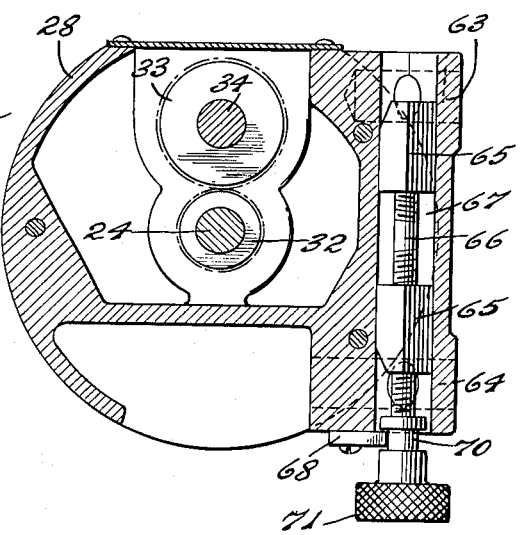
Figure 3 is a transverse section on the line 3—3 of Figure 1.

The motor may be mounted in any suitable way, Figure 3 showing recesses 63 and 64 to receive mounting posts, which are engaged in suitable notches by dogs 65 which may, for example, be oppositely threaded on a clamp shaft 66 to move in a square passage 67. The clamp shaft is retained in position by a retainer 68 riding in an annular groove 70. The clamp shaft is conveniently manipulated by a knob 71. See my copending application Serial No. 240,743, filed August 7, 1951, for Tool Holder Clamp.

In operation it will be evident that as the motor turns in the direction contemplated, air is drawn in through passage 54 along the rotor and along the longitudinal legs of the stator coils and the inside of the magnetic core. Air is also drawn in through passages 55 over the circumferential legs of the stator coils and over the outside of the magnetic core. When this air encounters the cowling 48, which in effect defines inwardly directed branches of the passages 55 delivering to the radial inner portion of the fan, it is pulled in to the inside and enters the fan near the shaft where it does not tend to swirl. The air is forced outwardly by the fan and reverses direction to flow through the passages 60 along the outside of the magnetic core, reaching the discharge ports 61 and being discharged at relatively low velocity.

It will thus be seen that the passages among them extend over almost the entire circumference, and at some points there are passages in reverse directions both inside and outside the magnetic core.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In an electric motor, a rotor, a stator coil around the rotor, a magnetic core surrounding the rotor and at least partially surrounding the stator coil, a housing surrounding the magnetic core, a shaft mounting the rotor and rotatably mounted in the housing, a fan on the shaft at one end of the rotor, there being inlet openings into the housing at the end remote from the fan, there being longitudinal passages between the inlet port and the fan through the space between the housing and the magnetic core around the outside of the stator coil, said passages terminating at their fan end in radial inwardly directed branches delivering to the radial inner portion of the fan, there being outlet ports through the housing adjacent the end of the magnetic core remote from the fan, and there being passages extending from the radial outer portion of the fan to the outlet ports in the space between the magnetic core and the housing.

2. In an electric motor, a rotor, a stator coil around the rotor, a magnetic core at least partially surrounding the stator coil, a housing around the magnetic core, a shaft mounting the rotor in the housing, a fan on the shaft at one end of the rotor, there being an inlet port at the end of the housing remote from the fan, there being an air cooling passage from the inlet port to the fan in the space between the rotor and the magnetic core along the stator coil, there being an air cooling passage between the inlet port and the fan in the space between the outside of the stator coil and the outside of the magnetic core on the one hand and the housing on the other hand, there being an outlet port through the housing adjacent the end of the magnetic core remote from the fan, and there being a reverse flow cooling passage between the fan and the outlet port in the space between the magnetic core and the housing.

3. An electric motor having a rotor and a stator coil relatively surrounding one another and a magnetic core around the outside, a housing surrounding the whole, a fan mounted on the rotor at one end, an air circulating passage longitudinal of the motor between the magnetic core and the housing to the fan and a separate reverse air circulating passage from the fan between the magnetic core and the housing, and bordering the magnetic core.

4. An electric motor having a rotor and a stator coil relatively surrounding one another and a magnetic core around the outside, a housing surrounding the whole, a fan mounted on the rotor at one end, an air circulating passage longitudinal of the motor to the fan between the magnetic core and the rotor, a separate air circulating passage to the fan longitudinal of the motor between the magnetic core and the housing and a separate reverse air circulating passage longitudinal of the motor from the fan between the magnetic core and the housing, and bordering the magnetic core.

5. In an electric motor, a rotor, a stator coil around the rotor, a magnetic core surrounding the rotor and at least partially surrounding the stator coil, a housing surrounding the whole, a shaft rotatably mounting the rotor in the housing, a fan mounted on the shaft at one end of the rotor, an inlet port to and an outlet port from the housing at the end opposite from the fan, an air circulating passage longitudinal of the motor from the inlet port to the fan, in the space between the stator coil and the housing, a cowling between the armature and the fan defining a radial inwardly directed passage between the fan end of said air circulating passage and the radial inner portion of the fan directing air from the air circulating passage into the fan near the shaft and a reverse air circulating passage extending from the radial outer portion of the fan to said outlet port and longitudinal of the motor between the magnetic core and the housing, and bordering the magnetic core.

6. In an electric motor, a rotor, a stator coil around the rotor, a magnetic core surrounding the rotor and at least partially surrounding the stator coil, a housing surrounding the whole, a shaft rotatably mounting the rotor in the housing, a fan mounted on the shaft at one end of the rotor, an inlet port to the housing at the end opposite from the fan, an air circulating passage longitudinal of the motor from the inlet passage to the fan, between the magnetic core and the rotor, a second air circulating passage longitudinal of the motor to the fan between the stator coil and the housing, a cowling between the rotor and the fan, having a passage adjacent the radial inner portion of the fan bringing the air from both the aforesaid passages into the fan adjacent the shaft, and a reverse air circulating passage longitudinal of the motor from the fan in the space between the magnetic core and the housing.

References Cited in the file of this patent

UNITED STATES PATENTS

| | | |
|---|---|---|
| 1,685,677 | Maxwell | Sept. 25, 1928 |
| 2,185,728 | Fechheimer | Jan. 2, 1940 |
| 2,240,664 | Moore | May 6, 1941 |
| 2,610,992 | Johns | Sept. 16, 1952 |
| 2,661,146 | Hill | Dec. 1, 1953 |

FOREIGN PATENTS

| | | |
|---|---|---|
| 3,224 | Great Britain | of 1913 |
| 364,191 | Great Britain | Jan. 7, 1922 |
| 467,527 | Great Britain | June 18, 1937 |